US00RE39123E

(19) United States
(12) Reissued Patent
Kuriyama et al.

(10) Patent Number: US RE39,123 E
(45) Date of Reissued Patent: Jun. 13, 2006

(54) PLATING APPARATUS

(75) Inventors: Fumio Kuriyama, Tokyo (JP); Hiroyuki Ueyama, Tokyo (JP); Junitsu Yamakawa, Tokyo (JP); Kenichi Suzuki, Tokyo (JP); Atsushi Chono, Tokyo (JP)

(73) Assignee: Ebara Corporation, Tokyo (JP)

(21) Appl. No.: 10/187,801

(22) PCT Filed: Nov. 26, 1999

(86) PCT No.: PCT/JP99/06600

§ 371 (c)(1),
(2), (4) Date: Jul. 27, 2000

(87) PCT Pub. No.: WO00/32850

PCT Pub. Date: Jun. 8, 2000

Related U.S. Patent Documents

Reissue of:
(64) Patent No.: 6,379,520
Issued: Apr. 30, 2002
Appl. No.: 09/601,084
Filed: Jul. 27, 2000

(30) Foreign Application Priority Data

Nov. 30, 1998 (JP) ..... 10-340576
Dec. 2, 1998 (JP) ..... 10-342611

(51) Int. Cl.
*C25D 21/12* (2006.01)
*C25B 15/00* (2006.01)
*C25B 7/00* (2006.01)

(52) U.S. Cl. ..... 205/81; 204/238; 204/263; 204/269

(58) Field of Classification Search ..... 204/237, 204/252, 232, 263, 269, 238; 205/81, 82
See application file for complete search history.

(56) References Cited

U.S. PATENT DOCUMENTS 3,658,470 A * 4/1972 Zievers et al. ..... 423/54
6,299,753 B1 * 10/2001 Chao et al. ..... 205/157

FOREIGN PATENT DOCUMENTS

JP 5-179496 * 7/1993
JP 10-121297 * 5/1998

* cited by examiner

*Primary Examiner*—Patrick Ryan
*Assistant Examiner*—Thomas H. Parsons
(74) *Attorney, Agent, or Firm*—Wenderoth, Lind & Ponack, L.L.P.

(57) ABSTRACT

The plating apparatus has a plating section in which a plating process is performed and a control section for regulating the plating solution. The plating section includes a plating bath containing plating solution, an anode provided in the plating solution, and a plating object serving as a cathode placed in the plating solution opposite the anode. The control section includes a regulating tank for regulating the composition and/or concentration of the plating solution, and a replenishing tank for injecting solution into the plating solution in the regulating tank. The plating apparatus also includes a mechanism for circulating plating solution between the regulating tank in the control section and the plating bath in the plating section. The plating section is installed in a first room, while the control section is installed in a second room, which is separate from the first room Accordingly, contamination in the plating section is prevented.

82 Claims, 10 Drawing Sheets

PLATING APPARATUS

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to a plating apparatus and particularly to a plating apparatus used in the semiconductor fabrication process for forming a metal plating on a substrate, such as a semiconductor wafer or the like.

2. Description of Related Art

The plating process is used frequently in semiconductor fabrication process to form wiring or films on a substrate. FIG. 1 shows the construction of this type of plating apparatus. As shown in the drawing, the plating apparatus comprises a plating section 1 and a control section 2. The plating section 1 includes a plating bath 1-2. The control section 2 includes a replenishing tank 2-2 and a replenishing tank 2-3.

The plating bath 1-2 accommodates a plating solution 1-1, a substrate 1-4 mounted on a wafer holder (not shown) in the plating solution 1-1, and a soluble anode 1-3 disposed in the plating solution 1-1 opposite the substrate 1-4. A power source 1-5 is connected between the substrate 1-4 and anode 1-3. The plating section 1 also includes a pump 1-6 and a temperature regulator 1-7. The pump 1-6 supplies the plating solution 1-1 to the temperature regulator 1-7. The temperature regulator 1-7 adjusts the plating solution 1-1 to a temperature optimal for the plating process and returns the plating solution 1-1 to the plating bath 1-2.

The replenishing tank 2-3 accommodates a plating solution 2-5, such as an aqueous solution primarily comprising predetermined concentrations of $CuSO_4$-$5H_2O$. The plating solution 2-5 is supplied to the plating bath 1-2 by the pump 2-7 through the pipe 3. The replenishing tank 2-2 accommodates an additive solution 2-4, and the solution 2-4 is supplied to the plating bath 1-2 by the pump 2-6 through the tube 4. When the apparatus is first powered on, new plating solution 2-5 is introduced into the plating bath 1-2. During plating operations, an analyzing apparatus (not shown) analyzes the composition and concentration of the plating solution 1-1 from the plating bath 1-2. Based on these analyses, the additive solution 2-4 or the plating solution 2-5 is supplied from the replenishing tank 2-2 or the replenishing tank 2-3 in order to maintain the composition and concentration of the plating solution 1-1 at predetermined values.

When the power source 1-5 supplies a plating current between the substrate 1-4 and anode 1-3, metallic ions, such as $Cu^{2+}$ are emitted from the soluble anode (for example, a phosphorus copper electrode) 1-3 and deposited on the surface of the substrate 1-4 to form a metallic plating film. It is necessary to replace the anode 1-3 periodically because the anode 1-3 is consumed as it emits metallic ions into the plating solution 1-1.

The plating solution used in this plating apparatus contains metallic ions that are deposited on a member to be plated. Sometimes the deposited metal is transferred or diffused. Further, when the plating solution or mist from the solution is vaporized, crystals are deposited, generating solid particles. This metallic deposited matter and the crystalline particles are causing contamination for clean rooms, semiconductor wafers, and circuit materials.

In the semiconductor fabrication process, metallic plating is embedded in fine wire channels and the like formed in the surface of semiconductor wafers. From a process control standpoint, it is advantageous to conduct these plating processes in a clean room. However, by installing the plating apparatus comprised of the plating section 1 and control section 2 in a clean room, the replenishing tank 2-2, replenishing tank 2-3, and liquid analyzer (not shown) must also be disposed in the clean room by association. This raises the problem of managing the above-described contamination during maintenance operations.

FIG. 2 shows an example construction of a plating apparatus employing a conventional insoluble anode. As shown in the drawing, the plating apparatus comprises a plating section 1 and a control section 2. The plating section 1 includes a hermetically sealed plating chamber 1-24 and a regulating tank 1-31. The control section 2 includes replenishing tanks 2-2, 2-3, 2-17, and 2-23. The plating chamber 1-24 is divided into an anode chamber 1-24a and a cathode chamber 1-24b by an ion exchange membrane 1-25. An insoluble anode 1-23 is disposed in the anode chamber 1-24a, while a substrate 1-4 is disposed in the cathode chamber 1-24b and opposes the anode 1-23 across the ion exchange membrane 1-25.

The regulating tank 1-31 is divided into an anode chamber 1-31a and a cathode chamber 1-31b by an ion exchange membrane 1-27. A soluble anode 1-28 is disposed in the anode chamber 1-31a, while a cathode 1-29 is disposed in the cathode chamber 1-31b and opposes the anode 1-28 across the ion exchange membrane 1-27. A power source 1-33 is connected between the anode 1-28 and cathode 1-29. The anode chamber 1-31a accommodates plating solution 1-1, while the cathode chamber 1-31b accommodates electrolytic solution 1-22. When the power source 1-33 applies a predetermined voltage between the anode 1-28 and cathode 1-29, the anode 1-28 dissolves and emits metallic ions.

A pump 1-14 supplies the plating solution 1-1 from the anode chamber 1-31a to the cathode chamber 1-24b via a tube 1-20 and a filter 1-16 provided on the tube 1-20. A pump 1-15 supplies electrolytic solution 1-22 from the cathode chamber 1-31b to the anode chamber 1-24a via a tube 1-21 and a filter 1-17 provided on the tube 1-21. The apparatus is also configured to return the electrolytic solution 1-22 from the anode chamber 1-24a and the plating solution 1-1 from the cathode chamber 1-24b to the cathode chamber 1-31b and anode chamber 1-31a, respectively.

Hence, the power source 1-5 applies a predetermined voltage between the anode 1-23 and substrate 1-4, supplying a current from the anode 1-23 to the substrate 1-4. The current forms a metallic film on the surface of the substrate 1-4. Metallic ions such as $Cu^{2+}$ ions consumed during the plating process in the plating chamber 1-24 are replenished from the regulating tank 1-31.

When using an insoluble electrode for the anode 1-23 as described above, there is no need to replace the electrode. Therefore, maintenance work can be reduced. However, the anode 1-28 in the regulating tank 1-31 must be replaced. Further, $O_2$ gas is released from the region near the anode 1-23 and $H_2$ gas is released from the region near the cathode 1-29. From a safety standpoint, it is not desirable for both gases to be released in the same clean room.

In the plating apparatus having the construction described above, a lot of the washing solution is discharged when washing the substrate 1-4 after the substrate is plated. Hence, a lot of washing solution and pure wafer are consumed, particularly when the substrate 1-4 to be plated is, for example, a semiconductor wafer for fabricating a semiconductor device. Further, since the washing solution contains plating solution, it is necessary to process the solution to remove metallic ions and the like, which can place a great burden on the wasted water processing equipment. The same problem exists when processing wasted plating solution that has been degraded.

Therefore, an effective method to reduce the overall load on the equipment is to provide the plating apparatus with functions to recover wasted plating solution and to process wash water. Such functions can perform specialized functions by themselves to enable the plating apparatus to process the plating solution and solution containing plating solution. Here, great benefits can be obtained by providing functions to regulate the plating solution, to remove metallic ions from the wash water after processing, and to re-regulate and recover wasted plating solution in a separate room from the room housing the plating section 1, which is required to be extremely clean. From a maintenance standpoint, it is very beneficial to manage the plating solution, process the plating solution, and process the wash water by the plating apparatus itself. However, a conventional plating apparatus has not been developed to perform these functions.

SUMMARY OF THE INVENTION

In view of the foregoing, it is an object of the present invention to provide a plating apparatus having a plating section and a control section, which sections are installed in separate rooms, such that maintenance work generating contamination is performed as much as possible in the room housing the control section, thereby minimizing maintenance work on the plating section and preventing contamination being generated therefrom.

It is another object of the present invention to provide a highly safe plating apparatus that does not release $O_2$ gas and $H_2$ gas in the same area.

It is another object of the present invention to provide a plating apparatus having special functions by itself to process wash water, recover wasted plating solution, and process plating solution and solution containing plating solution, wherein these functions are performed separately from the room housing the plating section which requires a high level of cleanliness.

To achieve the above-described subjects, there is provided a plating apparatus having a plating section for plating a plating object and a control section for regulating a plating solution and a solution containing-the plating solution. The plating apparatus is characterized in that: the plating section has a plating bath in which the plating process is performed by accommodating a plating solution therein and disposing an anode and a cathode as the plating object opposite the anode therein. The control section has a regulating tank for regulating a composition and/or concentration of the plating solution and a replenishing mechanism for injecting a replenishing solution into the plating solution therein. A circulating mechanism is provided for circulating the plating solution between the regulating tank in the control section and the plating bath in the plating section. The plating section is housed in a-first room and the control section is housed in a second room that is separate from the first room.

By providing the plating section in the first room and the control section in the second room as described above, operations for injecting additives into the plating solution to regulate its components, mixing other solutions, regulating the temperature of the plating solution, extracting plating solution for analyzing its components, and other dirty maintenance operations can all be performed in the second room in which the control section is provided and separate from the first room in which the plating section is provided. Hence, almost no contamination will be generated in the plating section.

Although $O_2$ gas is generated near the insoluble anode in the plating chamber and $H_2$ gas is generated near the cathode in the regulating tank, the $O_2$ gas and $H_2$ gas are not released in the same area because the plating section is in a separate room from the control section. Hence, the plating apparatus maintains safety by releasing the gases separately into the atmosphere.

The control section is provided with a regulating tank to regulate the composition and/or concentration of the plating solution; a replenishing mechanism for injecting plating solution and replenishing additives; an analyzer for analyzing components and/or measuring the concentration of the plating solution; a recovering apparatus for removing metallic ions contained in the wash solution after processing or for removing the ions and recovering the wash water; and a plating solution recovering apparatus for extracting plating solution from the regulating tank, removing foreign matter from the plating solution, and regulating the metallic ion concentration and hydrogen ion index. Accordingly, the plating apparatus is capable of processing wash water and recovering used plating solution. Hence, most of these processes are effectively performed in the second room housing the control section, thereby preventing contamination in the first room, which is required to have a high degree of cleanliness, and improving the efficiency of maintenance operations.

As described above, the plating section is housed in the first room having a high level of cleanliness, while the control section is housed in the second room having a level of cleanliness lower than that in the first room. As a result, dirty maintenance operations are concentrated in the utility room housing the control section, thereby greatly avoiding contamination in the clean room.

DETAILED DESCRIPTION OF THE INVENTION

A plating apparatus according to first embodiments of the present invention will be described while referring to the accompanying drawings. First embodiments of the present invention will be described with reference to FIGS. 3–6.

Figure 1:
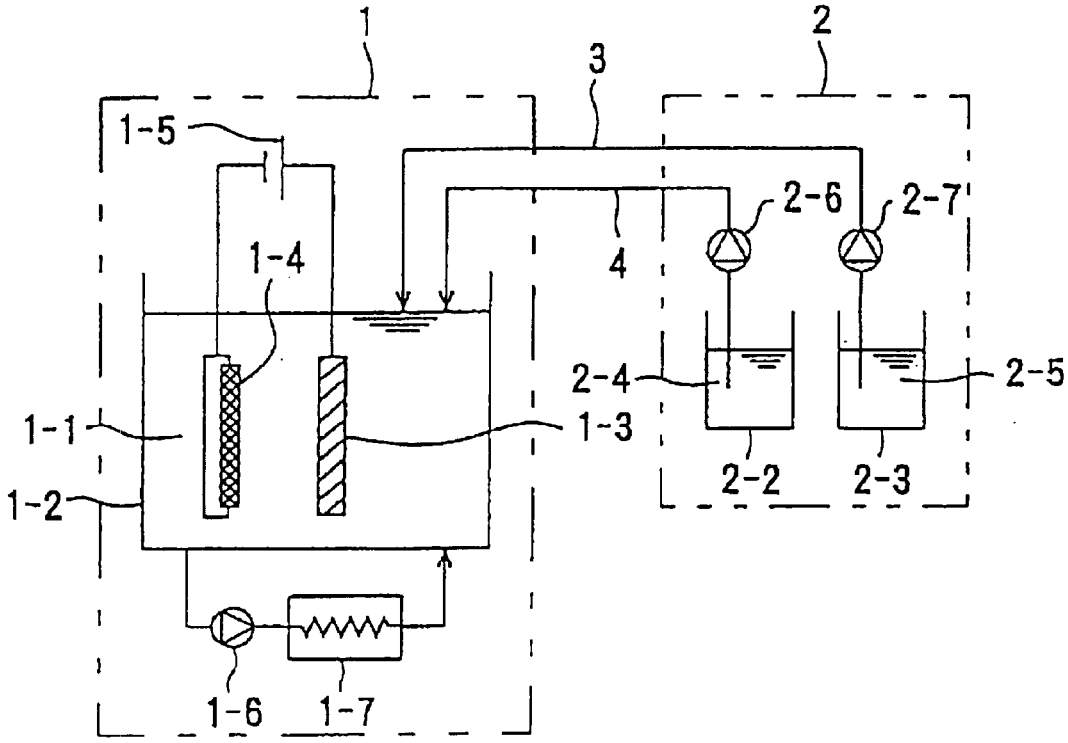
F I G. 1 (PRIOR ART)
FIG. 1 shows an example of a plating apparatus constructed in accordance with the prior art.
Figure 2:
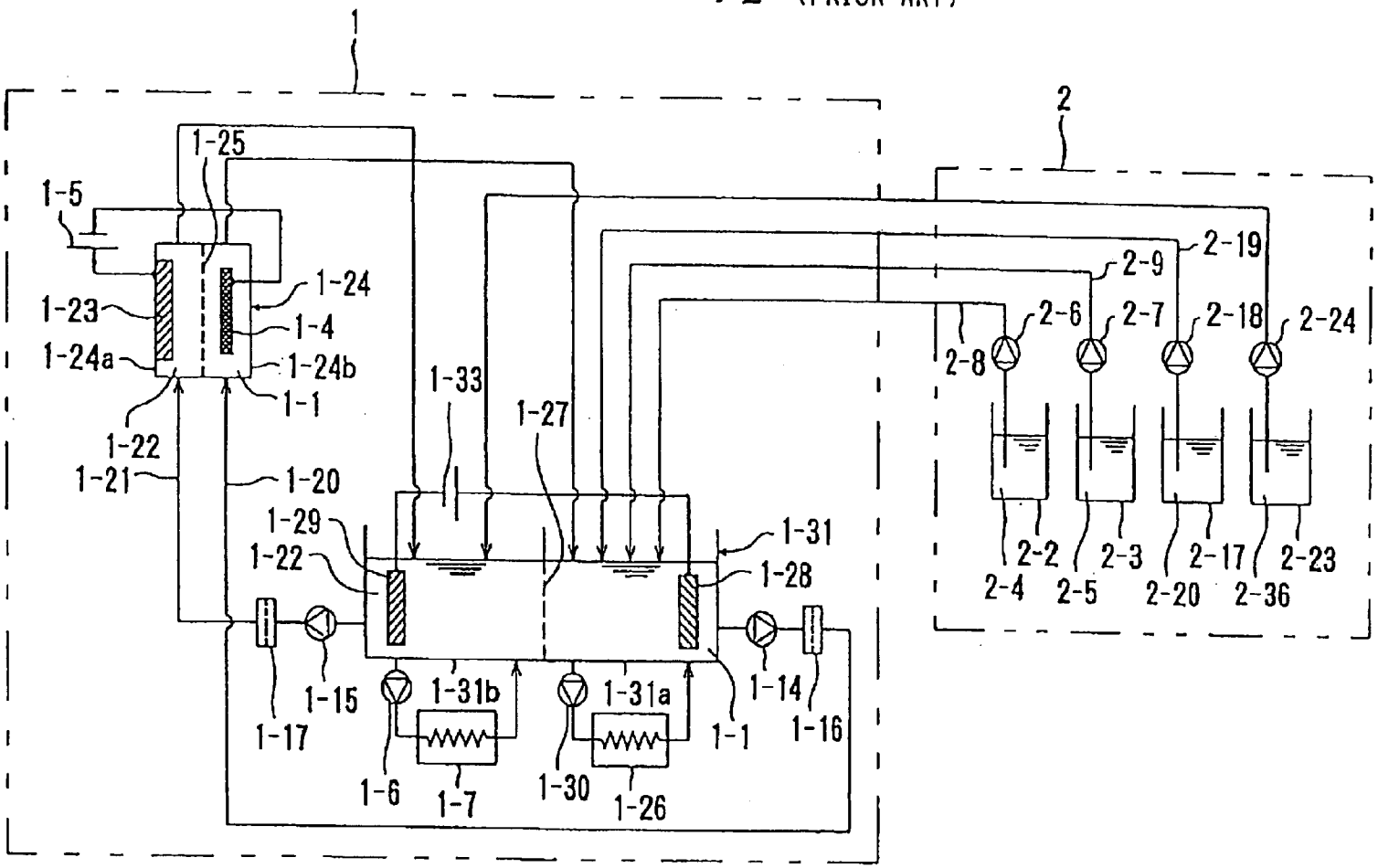
F I G. 2 (PRIOR ART)
FIG. 2 shows another example of a prior art apparatus.
Figure 3:
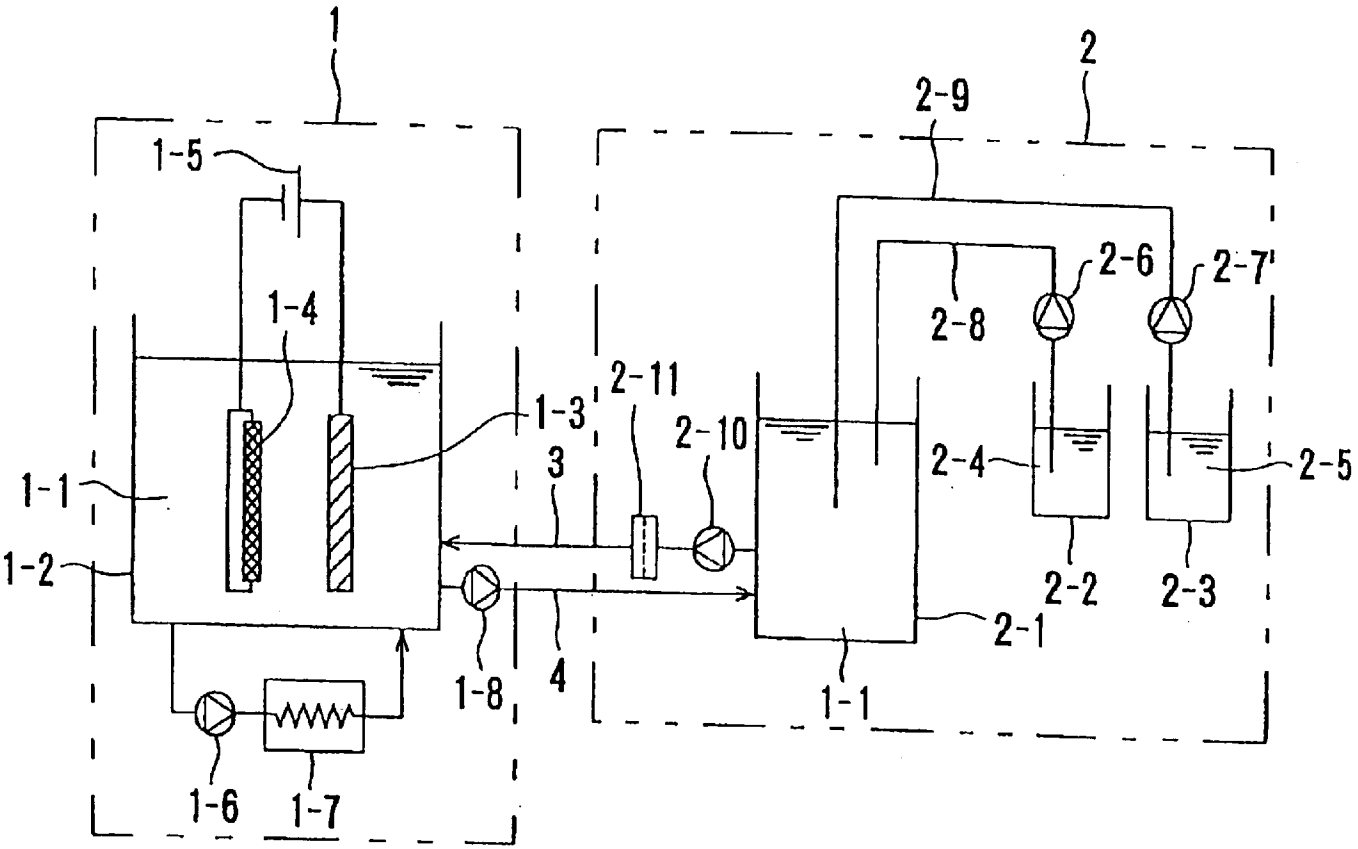
FIG. 3 shows an example construction of a plating apparatus according to the first embodiment of the present invention.

FIG. 3 shows an example construction of a plating apparatus according to the first embodiments of the present invention. In FIG. 3, components that have same reference numbers are identical or corresponding to those in FIG. 1 (such relationship is same in the following drawings). As shown in FIG. 3, the plating apparatus comprises a plating section 1 and a control section 2. The plating section 1 is installed in a first room having a high level of cleanliness, such as a clean room, while the control section 2 is installed in a second room having a low level of cleanliness, such as a utility room.

The plating section 1 includes a plating bath 1-2 accommodating a plating solution 1-1, a soluble anode 1-3 disposed in the plating solution 1-1, a substrate 1-4 mounted on a wafer holder in opposition to the anode 1-3. A power source 1-5 is connected between the anode 1-3 and substrate 1-4 for supplying a plating current from the anode 1-3 to the substrate 1-4. A temperature regulator 1-7 is provided for maintaining the plating solution 1-1 at a temperature that is suitable for plating, and a pump 1-6 is also provided for supplying plating solution 1-1 from the plating bath 1-2 to the temperature regulator 1-7 and returning the plating solution 1-1 to the plating bath 1-2 after the plating solution 1-1 is adjusted to an appropriate temperature.

The control section 2 includes a regulator tank 2-1, a replenishing tank 2-2, and another replenishing tank 2-3. The regulator tank 2-1 contains the plating solution 1-1 that is regulated at an appropriate temperature. The replenishing tank 2-2 contains an additive solution 2-4. The replenishing tank 2-3 contains a plating solution 2-5 (for example, having a main component of copper sulfate, at a predetermined concentration). A pump 2-6 supplies the additive solution 2-4 to the regulator tank 2-1 via a tube 2-8. A pump 2-7 supplies the plating solution 2-5 to the regulator tank 2-1 via a tube 2-9.

The regulator tank 2-1 is connected to the plating bath 1-2 by tubes 3 and 4. A pump 2-10 supplies the plating solution 1-1 from the regulator tank 2-1 to the plating bath 1-2 via the tube 3 and a filter 2-11 disposed on the tube 3. A pump 1-8 supplies the plating solution 1-1 from the plating bath 1-2 to the regulator tank 2-1 via the tube 4. In other words, a mechanism for circulating the plating solution 1-1 between the regulator tank 2-1 and plating bath 1-2 includes the tube 3, pump 2-10, filter 2-11, tube 4, and pump 1-8.

With this construction, the power source 1-5 applies a predetermined voltage between the substrate 1-4 and anode 1-3, forcing metallic ions, such as $Cu^{2+}$ to be emitted from the soluble anode 1-3 (for example, a phosphorous copper electrode). The metallic ions emitted from the anode 1-3 are deposited on the surface of the substrate 1-4 to form a metal plating film. After continuously performing the plating process and processing a plurality of substrate 1-4, the composition, concentration, and amount of the plating solution 1-1 varies. In response to these variations, additive solution 2-4 from the replenishing tank 2-2 and plating solution 2-5 from the replenishing tank 2-3 are supplied to the regulator tank 2-1 to maintain the composition and concentration of the plating solution 1-1 at predetermined values. The additive solution 2-4 in the replenishing tank 2-2 is an organic additive solution comprising a mixture of a polymer, leveler, carrier, and HCl.

As described above, the plating section 1 is installed in the first room having a high level of cleanliness, such as a clean room, while the control section 2 is installed in the second room having a low level of cleanliness, such as a utility room. Accordingly, the only operations performed in the first room are replacing the soluble anode 1-3. All other dirty operations, such as regulating the plating solution in the control section 2, are performed in the second room, thereby reducing the possibility of contaminating the first room. Further, by installing the control section 2, which requires a large amount of installation space, in the second room with a low level of cleanliness, it is possible to conserve precious installation space in the first room.

Figure 4:
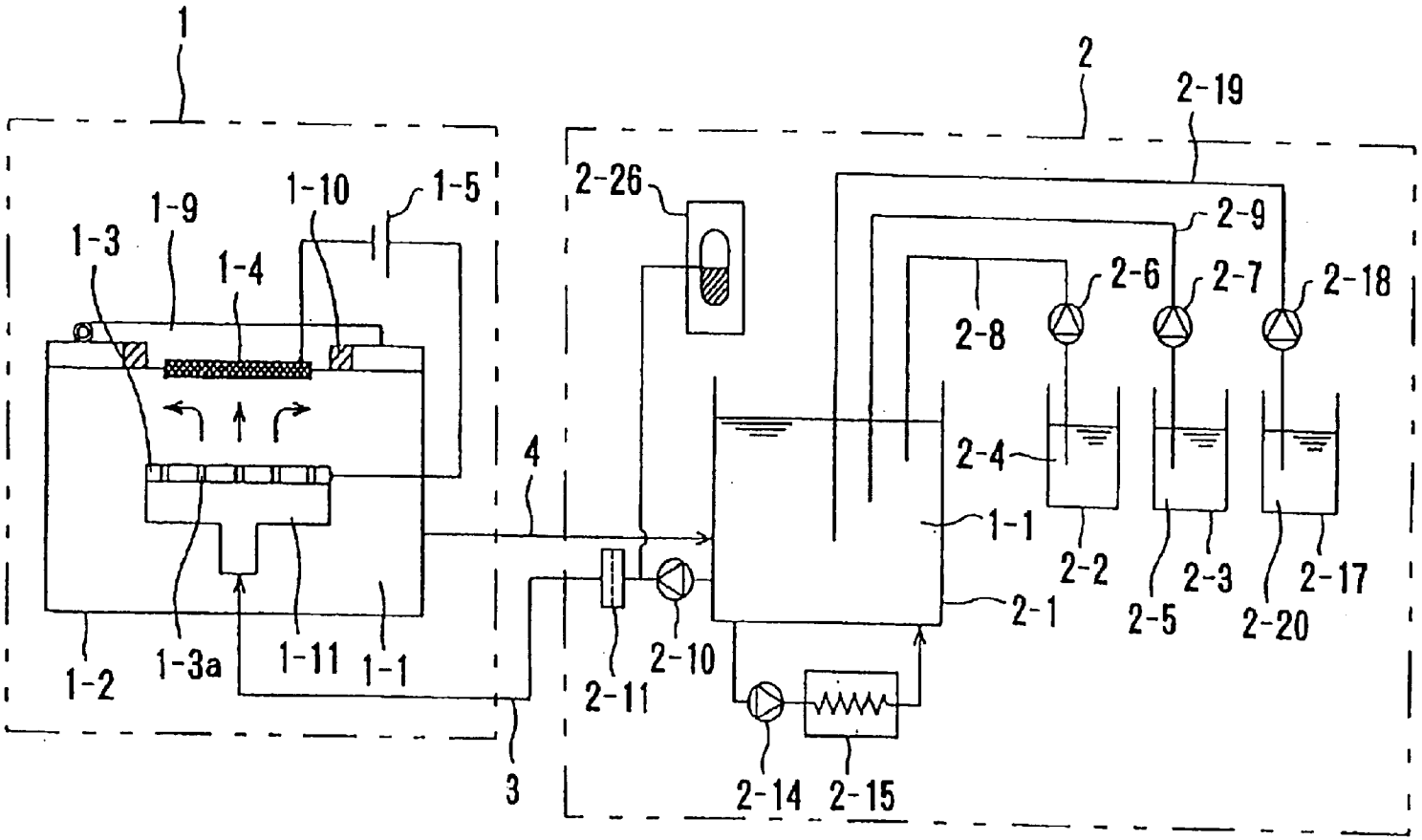
FIG. 4 shows a variation of a plating apparatus according to the first embodiment.

FIG. 4 is an example construction of a plating apparatus that is a variation of the plating apparatus described above. In this plating apparatus, a substrate retainer 1-9 is disposed at the top of the plating bath 1-2. The substrate 1-4 is mounted horizontally in the substrate retainer 1-9. The anode 1-3 is positioned below the substrate 1-4 at a predetermined distance. A seal 1-10 is provided around the substrate retainer 1-9 for hermetically sealing the substrate retainer 1-9 on top of the plating bath 1-2. A plurality of ejection holes 1-3a are formed in the anode 1-3 through which plating solution 1-1 is ejected. A casing 1-11 covers the bottom of the anode 1-3. With this construction, the anode 1-3 and casing 1-11 form a nozzle construction for ejecting the plating solution 1-1 toward the substrate 1-4.

In the control section 2, a temperature regulator 2-15 and a pump 2-14 are provided on the regulator tank 2-1 for maintaining the plating solution 1-1 in the regulator tank 2-1 at a predetermined temperature. An analyzer 2-26 is provided in the control section 2 for analyzing the composition and concentration of the plating solution 1-1 supplied from the regulator tank 2-1 to the plating bath 1-2. A replenishing tank 2-17 accommodating an additive solution 2-20 is also provided. A pump 2-18 supplies the additive solution 2-20 from the replenishing tank 2-17 to the regulator tank 2-1 via a tube 2-19.

The plating section 1 is installed in the first room having a high cleanliness, such as a clean room, while the control section 2 is installed in the second room having a low level of cleanliness, such as a utility room. The pump 2-10 supplies the plating solution 1-1 from the regulator tank 2-1 to the plating bath 1-2 via the tube 3 and the filter 2-11 disposed on the tube 3. The plating solution 1-1 passes through the ejection holes 1-3a in the anode 1-3 and is ejected toward the substrate 1-4. The plating bath 1-2 is filled with the plating solution 1-1. The power source 1-5 applies a predetermined voltage between the anode 1-3 and substrate 1-4, causing a current to flow from the anode 1-3 to the substrate 1-4 and form a metallic plating film on the substrate 1-4.

The analyzer 2-26 analyzes the composition and concentration of the plating solution 1-1 supplied to the plating bath 1-2 from the regulator tank 2-1. Based on the results of this analysis, additive solution 2-4 or plating solution 2-5 is supplied to the regulator tank 2-1 from the replenishing tank 2-2 and replenishing tank 2-3 respectively. Further, the regulator tank 2-1 is replenished with additive solution 2-20 from the replenishing tank 2-17. The additive solution includes a make-up additive necessary for forming a black film on the surface of the anode 1-3 when conducting an electrolytic purification at the beginning of the plating process, and a replenish additive needed for performing continuous plating operations. The additive solution 2-20 in the replenishing tank 2-17 is equivalent to the starter (makeup) additive, while the additive solution 2-4 in the replenishing tank 2-2 is equivalent to the replenish additive.

By installing the plating section 1 in the first room having high cleanliness and the control section 2 in the second room having low cleanliness as described above, the same effects described for the plating apparatus of FIG. 3 can be obtained. Here, the pump 2-10, filter 2-11, and temperature regulator 2-15 used for circulating the plating solution are provided in the control section 2. This is desirable because the control section 2 is installed in the second room. Therefore, maintenance operations on these components are performed in the second room.

Figure 5:
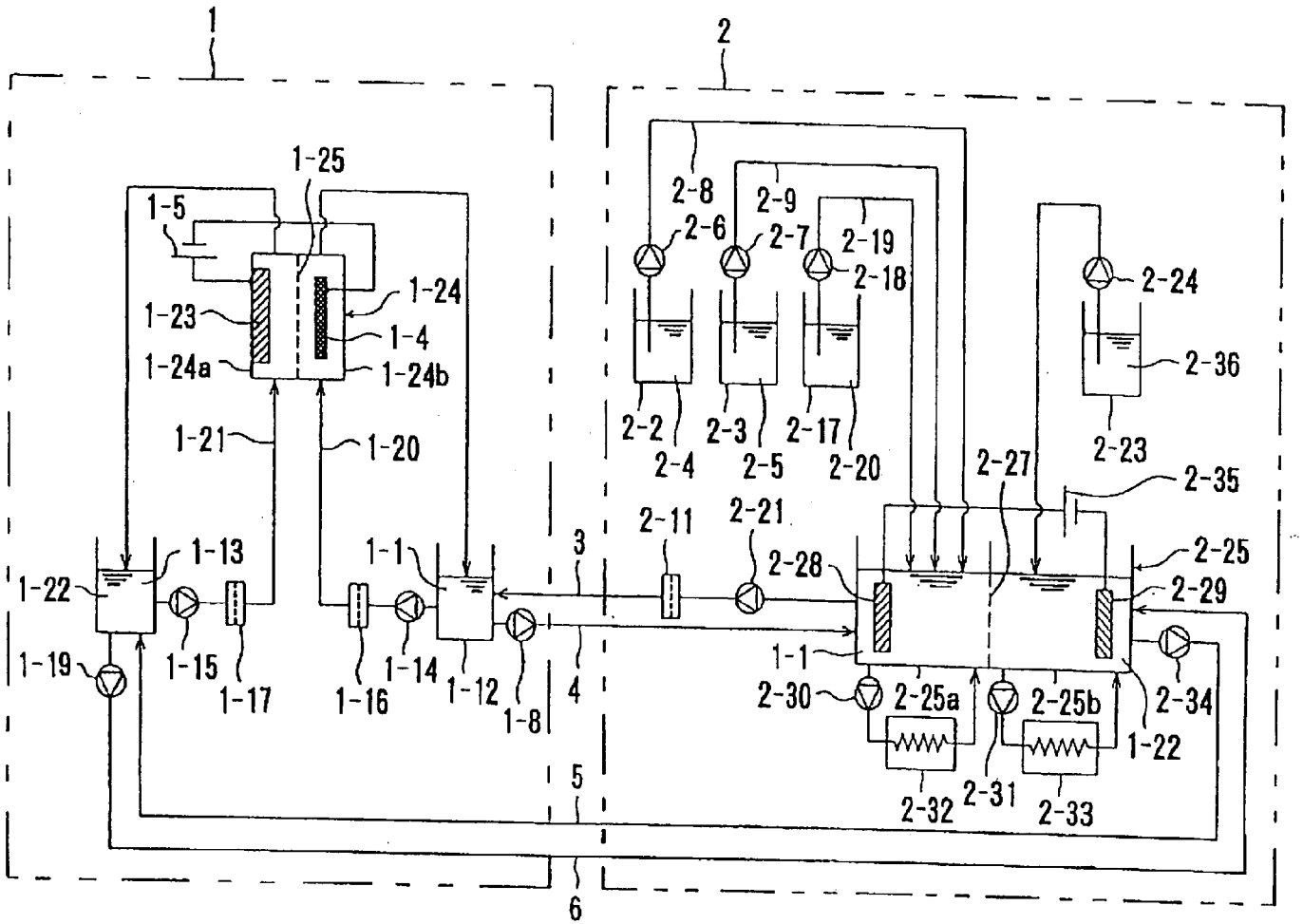
FIG. 5 shows another example construction of a plating apparatus according to the first embodiment.

FIG. 5 shows another variation of the plating apparatus described above. In this plating apparatus, the plating section 1 is provided with a hermetically sealed plating chamber 1-24. The substrate 1-4 and an insoluble anode 1-23 are disposed in the plating chamber 1-24 in opposition to each other. An ion exchange membrane 1-25 is disposed in the plating chamber 1-24 between the substrate 1-4 and anode 1-23, and partitions the plating chamber 1-24 to form an anode chamber 1-24a and a cathode chamber 1-24b.

The plating section 1 is also provided with a plating solution tank 1-12 accommodating the plating solution 1-1 whose main component is copper sulfate, for example, and an electrolytic solution tank 1-13 accommodating an electrolytic solution 1-22 whose main component is sulfuric acid, for example. A pump 1-14 supplies plating solution 1-1 from the plating solution tank 1-12 to the cathode chamber 1-24b via a tube 1-20 and a filter 1-16 disposed on the tube 1-20. The apparatus is configured to return plating solution 1-1 overflowing from the cathode chamber 1-24b to the plating solution tank 1-12. A pump 1-15 supplies electrolytic solution 1-22 from the electrolytic solution tank 1-13 to the anode chamber 1-24a via a tube 1-21 and a filter 1-17 disposed on the tube 1-21. The apparatus is configured to return electrolytic solution 1-22 over flowing from the anode chamber 1-24a to the electrolytic solution tank 1-13.

The control section 2 is also provided with a regulating tank 2-25. An ion exchange membrane 2-27 is disposed in the regulating tank 2-25 partitioning the regulating tank 2-25 into an anode chamber 2-25a and a cathode chamber 2-25b. A soluble anode 2-28, such as a phosphorous copper electrode, is provided in the anode chamber 2-25a. A cathode 2-29 is disposed in the cathode chamber 2-25b and opposes the anode 2-28 across the ion exchange membrane 2-27. A power supply 2-35 is connected between the anode 2-28 and cathode 2-29 to supply a predetermined current from the anode 2-28 to the cathode 2-29.

The anode chamber 2-25a accommodates the plating solution 1-1, while the cathode chamber 2-25b accommodates the electrolytic solution 1-22. The control section 2 is configured such that the anode chamber 2-25a can be supplied with additive solution 2-4, plating solution 2-5, and additive solution 2-20 from the replenishing tank 2-2, replenishing tank 2-3, and replenishing tank 2-17, respectively. The control section 2 is also provided with a pump 2-24 for supplying an electrolytic solution 2-36 from a replenishing tank 2-23 to the cathode chamber 2-25b.

A pump 2-30 and a temperature regulator 2-32 are connected to the anode chamber 2-25a in order to maintain the plating solution 1-1 in the anode chamber 2-25a at a predetermined temperature. A pump 2-31 and a temperature regulator 2-33 are connected to the cathode chamber 2-25b in order to maintain the electrolytic solution 1-22 in the cathode chamber 2-25b at a predetermined temperature.

The electrolytic solution tank 1-13 of the plating section 1 and the cathode chamber 2-25b of the control section 2 are connected by tubes 5 and 6. A pump 2-34 supplies electrolytic solution 1-22 regulated at a predetermined concentration in the cathode chamber 2-25b to the electrolytic solution tank 1-13.

A pump 1-19 supplies the electrolytic solution 1-22 in the electrolytic solution tank 1-13 to the cathode chamber 2-25b in order to maintain the concentration of the electrolytic solution in the electrolytic solution tank 1-13 at a predetermined value.

The plating solution tank 1-12 of the plating section 1 and the anode chamber 2-25a of the control section 2 are connected by the tubes 3 and 4. A pump 2-21 supplies the plating solution 1-1 regulated at a predetermined composition and concentration in the anode chamber 2-25a to the plating solution tank 1-12 via the tube 3 and the filter 2-11. The pump 1-8 supplies the plating solution 1-1 from the plating solution tank 1-12 to the anode chamber 2-25a via the tube 4 in order to maintain the plating solution 1-1 in the plating solution tank 1-12 at a predetermined composition and concentration.

With this construction, the power source 1-5 supplies a current between the substrate 1-4 and anode 1-23 in the plating chamber 1-24. The current causes metallic ions, such as $Cu^{2+}$ in the plating solution 1-1 of the cathode chamber 1-24b to deposit on the surface of the substrate 1-4 and form a metallic plating film thereon. During the plating process, $O_2$ gas is emitted near the anode 1-23, lowering the PH value of the electrolytic solution 1-22 in the anode chamber 1-24a.

The power supply 2-35 supplies a current between the anode 2-28 and cathode 2-29 in the regulating tank 2-25, causing metallic ions, such as $Cu^{2+}$ to dissolve from the anode 2-28. As the metallic ions dissolve from the anode 2-28, the concentration of metallic ions in the plating solution 1-1 rises. At the same time, $H_2$ gas is emitted near the cathode 2-29, raising the PH value of the electrolytic solution 1-22 in the cathode chamber 2-25b. The pump 2-21 feeds this metallic ion-rich plating solution 1-1 to the plating solution tank 1-12, thereby replenishing the plating solution 1-1 in the plating solution tank 1-12 with metallic ions.

The plating section 1 is installed in the first room having a high degree of cleanliness, such as a clean room. The control section 2 is installed in the second room having a low degree of cleanliness, such as a utility room. Since the anode 1-23 in the plating chamber 1-24 is insoluble, it is not necessary to replace the anode 1-23, thereby almost entirely eliminating the need for maintenance operations on the plating section 1 installed in the first room. The anode 2-28 is soluble and must be periodically replaced as it is consumed. However, it is no problem to perform this dirty operation for replacing the anode 2-28 because the operation is performed in the second room.

As described above, $O_2$ gas is generated and emitted near the anode 1-23, while $H_2$ gas is generated and emitted near the cathode 2-29. However, since the plating section 1 and control section 2 are installed in the first room and second room, respectively, the $O_2$ gas and $H_2$ gas are released into the atmosphere in separate locations. Hence, this configuration is desirable from a safety standpoint.

Figure 6:
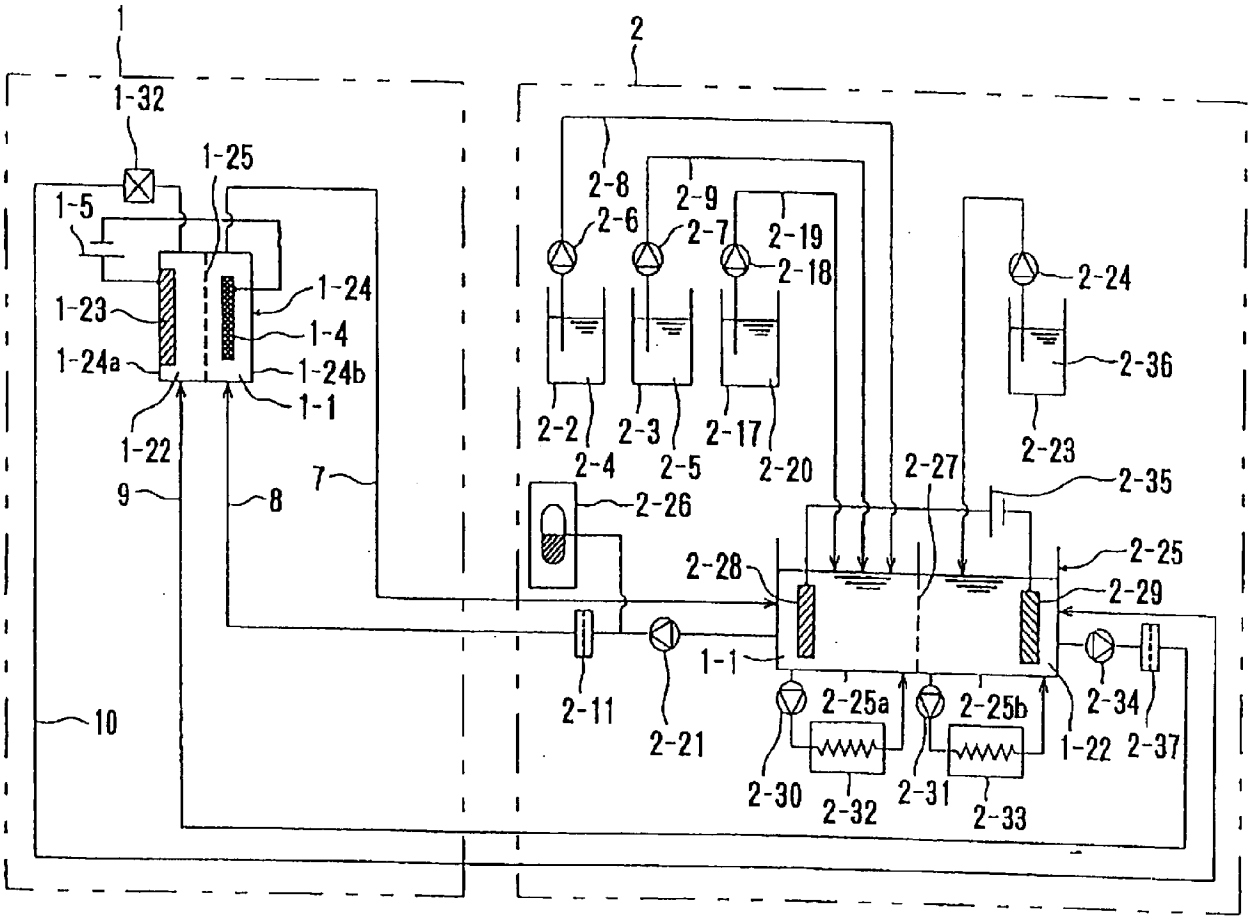
FIG. 6 shows a variation of a plating apparatus according to the first embodiment.

FIG. 6 is another variation of the plating apparatus described above. The plating apparatus of FIG. 6 differs from that shown in FIG. 5 in that it has omitted the plating solution tank 1-12 and electrolytic solution tank 1-13 from the plating section 1. Further, the pump 2-21 supplies the plating solution 1-1 from the anode chamber 2-25a to the cathode chamber 1-24b directly via a tube 8 and the filter 2-11. The plating solution 1-1 overflowing from the cathode chamber 1-24b is returned to the anode chamber 2-25a directly via a tube 7.

Further, the pump 2-34 supplies electrolytic solution 1-22 from the cathode chamber 2-25b directly to the anode chamber 1-24a via a tube 9 and a filter 2-37 disposed on the tube 9. The electrolytic solution 1-22 overflowing from the anode chamber 1-24a returns to the cathode chamber 2-25b via a tube 10. Since $O_2$ gas is generated from the region near the insoluble anode 1-23 at this time, a gas valve 1-32 is provided on the tube 10 to release the gas.

The plating section 1 is installed in the first room having a high level of cleanliness, such as a clean room, while the control section 2 is installed in the second room having a low level of cleanliness, such as a utility room. With this configuration, the plating section 1 includes almost no mechanisms that require maintenance, thereby further simplifying the construction. Hence, there is even less chance of the plating section 1 contaminating the first room than with the plating apparatus of FIG. 5.

In the plating apparatus described in FIGS. 5 and 6, the ion exchange membrane 1-25 partitioning the plating chamber 1-24 into the anode chamber 1-24a and cathode chamber 1-24b is not limited to an ion exchange membrane, but can also be a porous membrane. Further, the ion exchange membrane 2-27 dividing the regulating tank 2-25 into the anode chamber 2-25a and cathode chamber 2-25b is not limited to an ion exchange membrane, but can also be a membrane having high ion selective permeability.

In the plating apparatus having the construction described in FIGS. 3–6, the first room in which the plating section 1 is installed is a clean room. However, the first room is not limited to being a clean room, but can be a room or area having high cleanliness, such as a clean booth, clean bench, or clean box.

In the construction of the plating apparatus described in FIGS. 3–6, the power source 1-5 is disposed in the plating section 1, which in turn is installed in the first room. However, it is also possible to provide the power source 1-5 in the second room in which the control section 2 is installed, such that the power source 1-5 supplies electricity from the second room. With this configuration, maintenance operations on the power source 1-5 can also be performed in the second room housing the control section 2. If the power source 1-5 is a storage battery (accumulator), in particular, it is desirable to perform the dirty maintenance work required for the storage battery in the second room.

In the construction described in FIGS. 3–6, one plating section 1 is provided with one control section 2. However, it is also possible to configure the plating apparatus with one control section 2 for a plurality of plating section S1. In this case, the plurality of plating section S1 are installed in the first room, while the single control section 2 is installed in the second room, and the one control section 2 controls the plurality of plating section S1.

While the description of some apparatus were omitted from the construction described in FIGS. 3–6, mechanisms that require maintenance, such as a flow meter for measuring the flow of solution including plating solution or electrolytic solution, a pressure gauge for measuring pressure, and a temperature gauge are installed in the second room having a low degree of cleanliness. Accordingly, there is no fear of contaminating the first room having a high level of cleanliness by performing such maintenance in that room.

Although the object of plating is described as a substrate, such as a semiconductor wafer, the plating object is not limited to a substrate.

The invention described above has the following superior effects.

In the plating apparatus according to the present invention, mechanisms requiring maintenance work are installed as much as possible in the control section to minimize maintenance required for the plating section. Further, the plating section is installed in the first room, while the control section is installed in the second room. Accordingly, contamination caused by the plating section is reduced, and maintenance work performed on the control section does not contaminate the first room in which the plating section is installed.

In the plating apparatus of the present invention, $O_2$ gas is emitted near the insoluble anode in the plating chamber of the plating section, while $H_2$ gas is emitted near the cathode of the regulating tank in the control section. However, since the plating section and control section are installed in separate rooms, the $O_2$ gas and $H_2$ gas are not released in the same atmosphere, but are released into the atmosphere in separate areas, thereby preserving safety of the operation. Since the anode used in the plating chamber is an insoluble anode, there is no need to perform the dirty operation of replacing the anode in the first room, where the plating section is installed.

In the embodiments described above, the first room housing the plating section is a clean room, while the second room housing the control section is a utility room. Hence, maintenance work capable of contaminating the clean room that requires a high level of cleanliness is performed in the utility room, thereby avoiding contaminating the clean room.

Next, a second embodiment of the present invention will be described with reference to FIGS. 7–11.

Figure 7:
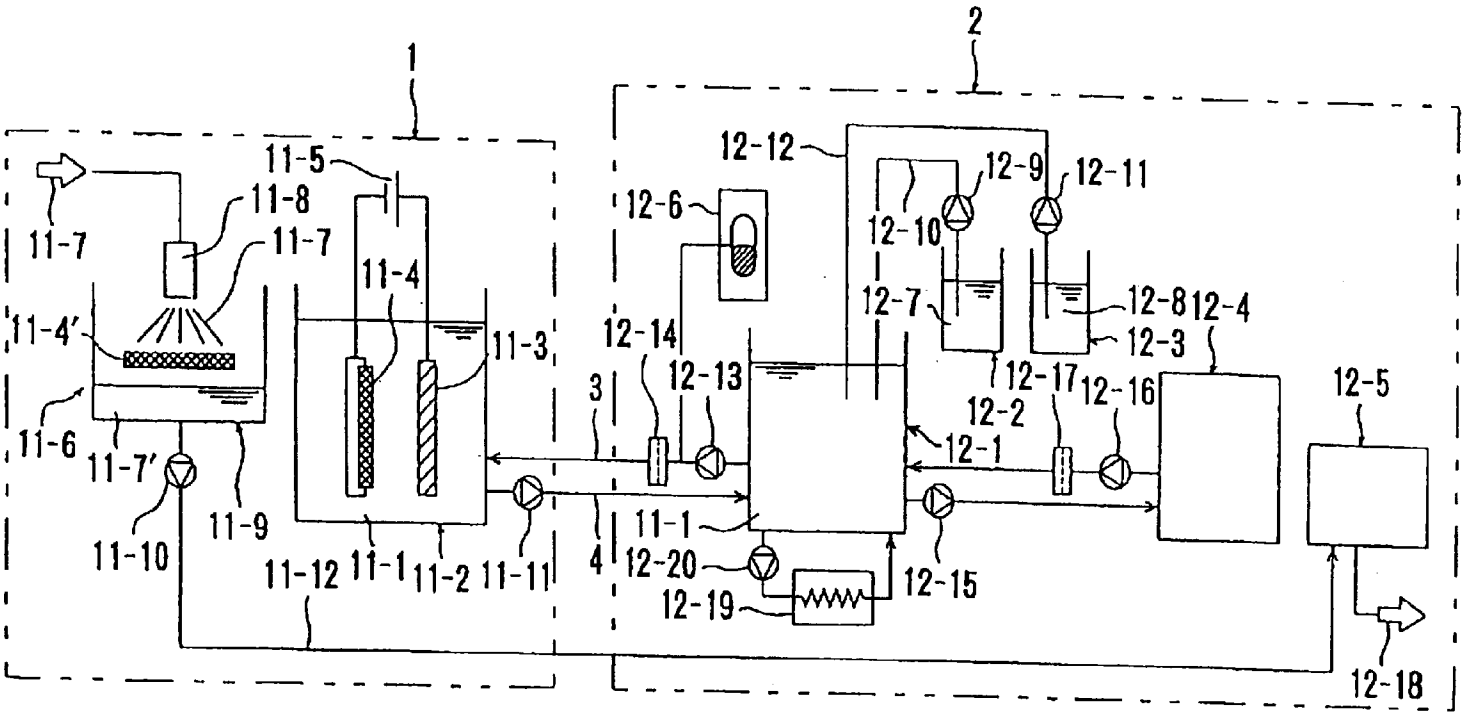
FIG. 7 shows an example construction of a plating apparatus according to the second embodiment.

FIG. 7 shows an example construction of a plating apparatus according to the present invention. As shown in the drawing, the plating apparatus comprises a plating section 1 and a control section 2.

The plating section 1 is provided with a plating bath 11-2 and a washing apparatus 11-6. The plating bath 11-2 accommodates a plating solution 11-1 and is further provided with an anode 11-3 disposed in the plating solution 11-1 and a substrate 11-4, such as a semiconductor wafer, mounted on a wafer holder and disposed opposite the anode 11-3. The substrate 11-4 serves as a cathode. A power supply 11-5 is connected between the anode 11-3 and substrate 11-4. The power supply 11-5 supplies a plating current between the anode 11-3 and substrate 11-4 to form a metallic plating film, such as a copper film, on the surface of the substrate 11-4.

The washing apparatus 11-6 is provided to wash a substrate 11-4' after the plating process. In addition to the substrate 11-4', the washing apparatus 11-6 includes a nozzle 11-8 for ejecting a wash water 11-7, such as pure water, at the substrate 11-4'; and a wash water tank 11-9 for receiving and accommodating a wash water 11-7' that has already been used after being ejected from the nozzle 11-8. A pump 11-10 is provided to supply wash water 11-7' from the wash water tank 11-9 to the control section 2.

The control section 2 is provided with a regulating tank 12-1, a replenishing tank 12-2, a replenishing tank 12-3, a plating solution recovering apparatus 12-4, a metallic ion extractor 12-5, and an analyzer 12-6. The regulating tank 12-1 accommodates the regulated plating solution 11-1. The replenishing tank 12-2 accommodates an additive solution 12-7. The replenishing tank 12-3 accommodates a plating solution 12-8, whose main component is copper sulfate, for example, having a predetermined concentration. A pump 12-9 supplies the additive solution 12-7 to the regulating tank 12-1 via a tube 12-10. A pump 12-11 supplies the plating solution 12-8 to the regulating tank 12-1 via a tube 12-12.

The regulating tank 12-1 and plating bath 11-2 are connected by the tubes 3 and 4. A pump 12-13 supplies plating solution 11-1 from the regulating tank 12-1 to the plating bath 11-2 via the tube 3 and a filter 12-14 disposed on the tube 3. A pump 11-11 supplies plating solution 11-1 from the plating bath 11-2 to the regulating tank 12-1 via the tube 4. Hence, a mechanism for circulating plating solution 11-1 between the regulating tank 12-1 and the plating bath 11-2 includes the tube 3, pump 12-13, filter 12-14, tube 4, and pump 11-11.

A pump 12-15 supplies plating solution 11-1 from the regulating tank 12-1 to the plating solution recovering apparatus 12-4. The plating solution recovering apparatus 12-4 removes foreign matter from the plating solution 11-1 and adjusts the metallic ion concentration, hydrogen ion index, and the like. After the plating solution 11-1 is processed in the plating solution recovering apparatus 12-4, a pump 12-16 supplies the processed plating solution 11-1 to the regulating tank 12-1 via a filter 12-17. Hence, a mechanism for circulating plating solution 11-1 between the regulating tank 12-1 and plating solution recovering apparatus 12-4 comprises the pump 12-15, pump 12-16, and filter 12-17.

The pump 11-10 supplies wash water 11-7' from the wash water tank 11-9 that has been used for washing to the metallic ion extractor 12-5 via a tube 11-12. The metallic ion extractor 12-5 extracts (removes) metallic ions such as $Cu^{2+}$ from the wash water 11-7' and discharges the wash water 11-7' as a normal wastewater 12-18. The control section 2 is also provided with a temperature regulator 12-19 and a pump 12-20. The pump 12-20 flows plating solution 11-1 from the regulating tank 12-1 through the temperature regulator 12-19 to adjust the temperature and maintain the plating solution at a predetermined temperature.

Further, a portion of the plating solution 11-1 transmitted from the regulating tank 12-1 by the pump 12-13 is supplied to the analyzer 12-6. The analyzer 12-6 analyzes the components and/or concentration of the plating solution. Based on the results of this analysis, either the pump 12-9 or the pump 12-11 are activated to replenish the regulating tank 12-1 with either additive solution 12-7 from the replenishing tank 12-2 or plating solution 12-8 from the replenishing tank 12-3, thereby regulating the composition and/or concentration of the plating solution 11-1 in the regulating tank 12-1.

With the construction described above, the power supply 11-5 applies a predetermined voltage across the substrate 11-4 and the anode 11-3, causing metallic ions such as $Cu^{2+}$ to emit from the soluble anode 11-3 (which is a phosphorous copper electrode, for example) and deposit on the surface of the substrate 11-4 to form a metallic film. After continuous plating operations and after performing the process on a plurality of substrate S11-4, the composition and concentration of the plating solution 11-1, as well as the amount of the plating solution 11-1, fluctuates. Based on the state of these fluctuations, the regulating tank 12-1 is replenished with additive solution 12-7 or plating solution 12-8 from the replenishing tank 12-2 or replenishing tank 12-3, respectively, in order to maintain the composition and concentration of the plating solution 11-1 at predetermined values. The additive solution 12-7 contained in the replenishing tank 12-2 is an organic additive solution comprising a mixture of polymers, levelers, carriers, and HCl.

The plating section 1 of the plating apparatus described above is installed in the first room having a high level of cleanliness, such as a clean room, while the control section 2 is installed in the second room having a low level of cleanliness, such as a utility room. As a result, the wash water 11-7' stored in the wash water tank 11-9 after being used for washing is transferred to the metallic ion extractor 12-5 by the pump 11-10. The metallic ion extractor 12-5 removes the metallic ions and discharges the solution as the normal wastewater 12-18.

Figure 8:
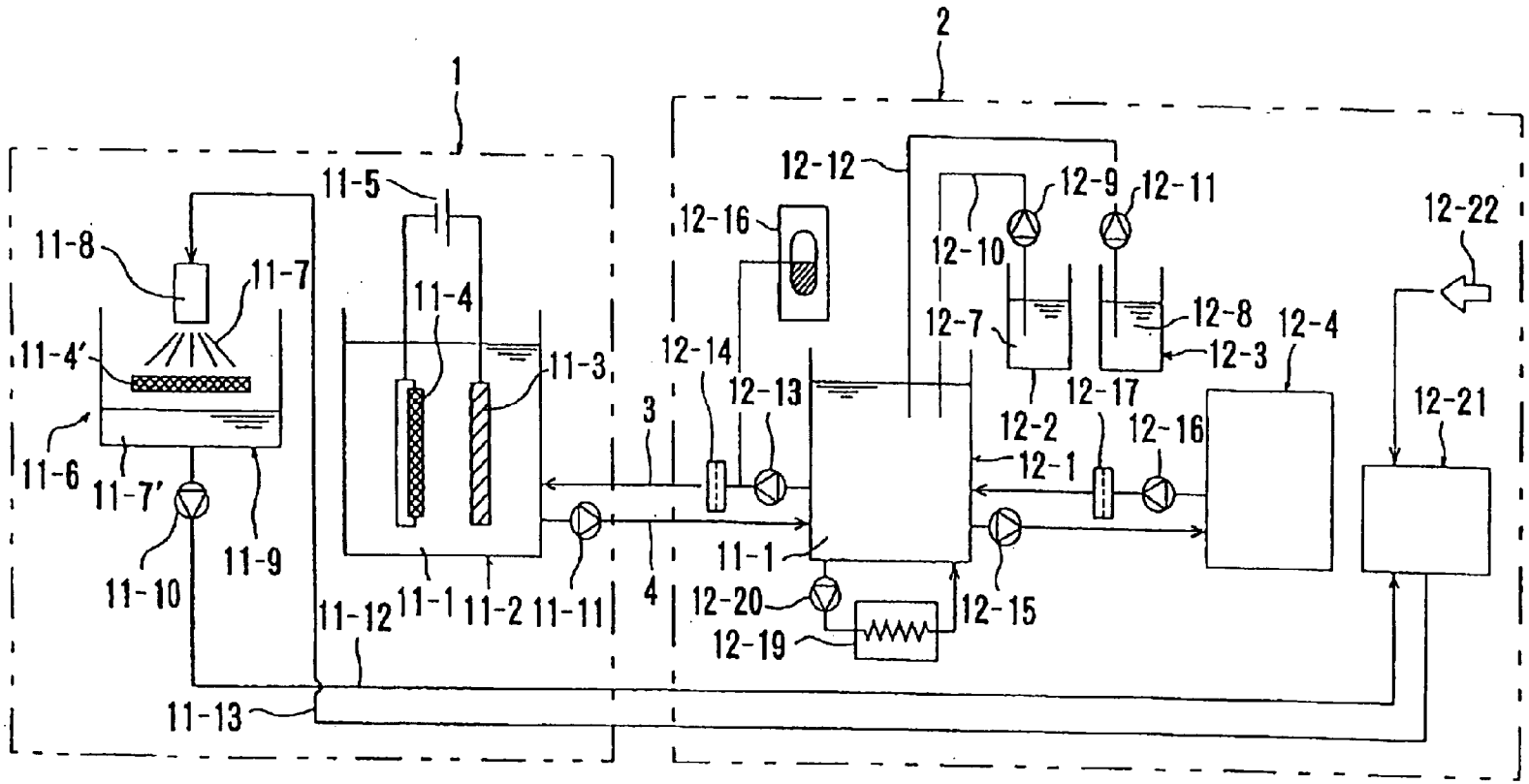
FIG. 8 shows a variation of a plating apparatus according to the second embodiment.

FIG. 8 is a variation of the plating apparatus of FIG. 7. In FIG. 8, same numbers corresponding to those in FIG. 7 represent the same or similar parts. The plating apparatus of FIG. 8 differs from that of FIG. 7 in that the apparatus of FIG. 8 is provided with a wash water recovering apparatus 12-21 in the control section 2 in place of the metallic ion extractor 12-5. Hence, the pump 11-10 supplies wash water 11-7' from the wash water tank 11-9 to the wash water recovering apparatus 12-21 via the tube 11-12. The wash water recovering apparatus 12-21 removes metallic ions and foreign matter from the wash water 11-7' to recover the wash water. The recovered wash water is supplied to the nozzle 11-8 via a tube 11-13 and reused as wash water 11-7. When necessary, the wash water recovering apparatus 12-21 is replenished with a pure water 12-22.

Figure 9:
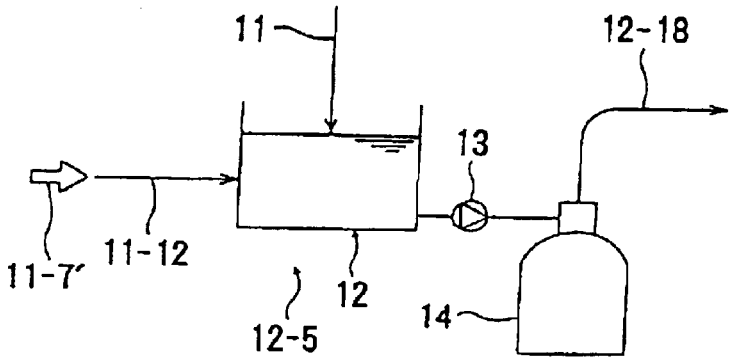
FIG. 9 shows an example construction of the metallic ion extractor of FIG. 7.

FIG. 9 shows an example construction of the metallic ion extractor 12-5. The metallic ion extractor 12-5 is provided with a PH regulating tank 12 and a chelate resin column 14. The wash water 11-7' in the wash water tank 11-9 that has been used for washing in the plating section 1 of FIG. 7 is transferred via the tube 11-12 by the pump 11-10 and stored in the PH regulating tank 12. The PH regulating tank 12 injects a corrective 11 into the wash water 11-7' to regulate the PH value of the same. After the PH value has been regulated, a pump 13 transfers the wash water 11-7' to the chelate resin column 14.

If the wash water 11-7' contains metallic ions such as $Cu^{2+}$ ions when passing through the chelate resin column 14, a chemical reaction will occur ($R{=}Ca+Cu^{2+}\rightarrow R{=}Cu+Ca^{2+}$, where R represents a functional group). In this reaction, $Cu^{2+}$ ions having a higher selectivity than $Ca^{2+}$ ions are replaced with $Ca^{2+}$ ions from a Ca-type chelate resin in the chelate resin column 14. Hence, the $Cu^{2+}$ ions are adsorbed to the end of the functional group, thereby eliminating $Cu^{2+}$ ions from the wash water. After the ions have been removed from the wash water 11-7' in the chelate resin column 14 as described above, the wash water 11-7' is discharged as wastewater 12-18.

Figure 10:
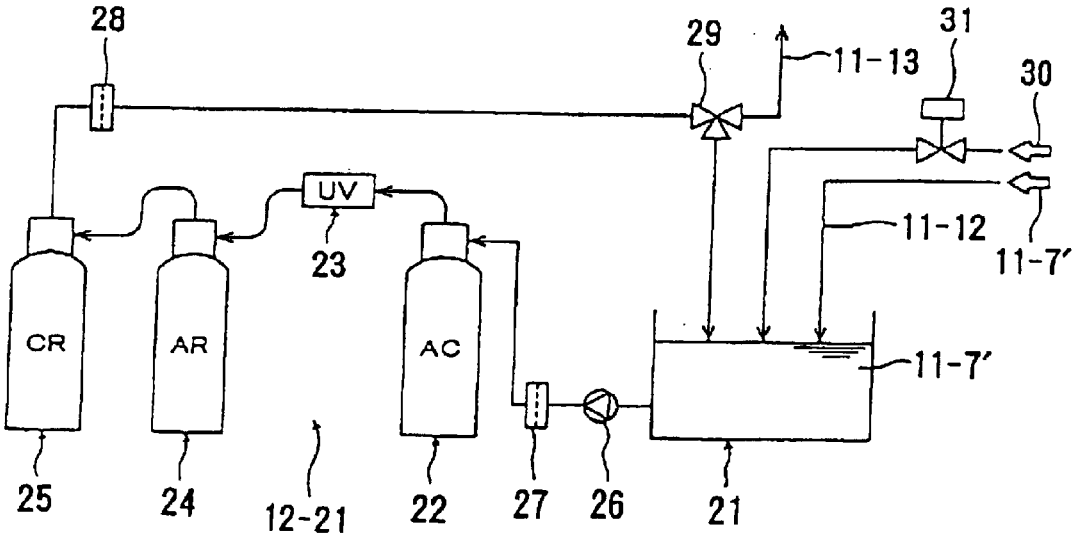
FIG. 10 shows an example construction of the wash water recovering apparatus of FIG. 8.

FIG. 10 shows an example construction of the wash water recovering apparatus 12-21 in FIG. 8. The wash water recovering apparatus 12-21 includes a wastewater storage tank 21, a surface-active agent column 22, an ultraviolet disinfecting column 23, an anion exchange resin column 24, and a cation exchange resin column 25. After being used for washing, the wash water 11-7' is transferred from the wash water tank 11-9 shown in FIG. 8 by the pump 11-10 via the tube 11-12 and is stored in the wastewater storage tank 21.

A pump 26 feeds the wash water 11-7' from the wastewater storage tank 21 through a filter 27 to remove any foreign matter. Next, the wash water 11-7' passes through the surface-active agent column 22 in which organically added decomposed matter and foreign matter are adsorbed and removed. Next, the wash water 11-7' passes through the ultraviolet disinfecting column 23, which restrains the propagation of various bacteria. As the wash water 11-7' passes through the anion exchange resin column 24 and cation exchange resin column 25, anions and cations are replaced with hydroxyl ions $OH^-$ and hydrogen ions $H^+$ to reproduce pure water. Next, the solution passes through a filter 28 to remove any foreign matter. The recovered pure water is then supplied to the nozzle 11-8 via a three-way valve 29 and the tube 11-13. When necessary, the wastewater storage tank 21 is replenished with a pure water 30 supplied via a shutoff valve 31.

Figure 11:
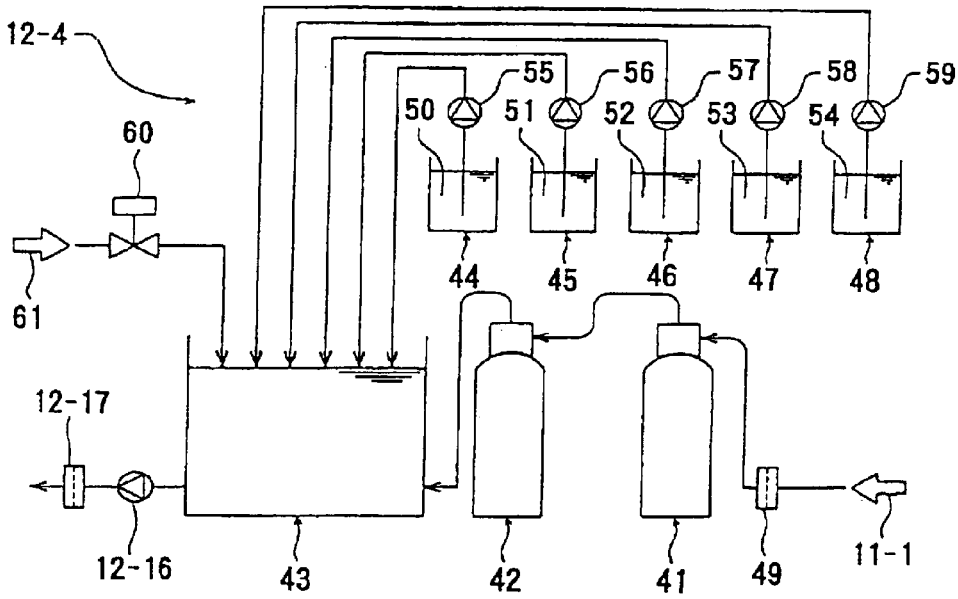
FIG. 11 shows an example construction of the plating solution recovering apparatus of FIG. 8.

FIG. 11 shows an example construction of the plating solution recovering apparatus 12-4 shown in FIG. 8. The plating solution recovering apparatus 12-4 comprises a surface-active agent column 41, a surface-active agent column 42, a plating solution recovering tank 43, an additive solution tank 44, an additive solution tank 45, a copper sulfate solution tank 46, a sulfuric acid tank 47, and a hydrochloric acid tank 48. The plating solution 11-1 containing foreign matter and the like supplied from the regulating tank 12-1 shown in FIG. 7 or 8 passes through a filter 49 to remove any solid particles. Next, the plating solution 11-1 passes through the surface-active agent column 41 and surface-active agent column 42 to remove foreign matter such as decomposed matter from the organic additives. Here, two surface-active agent columns (41 and 42) having different properties are provided because the foreign matter and decomposed matter from the organic additives have both high and low molecular weight. Therefore, it is necessary to provide plural type surface-active agent columns in order to adsorb the foreign matter of different molecular weights effectively.

Next, the plating solution 11-1 is stored in the plating liquid recovering tank 43. Into the plating solution recovering tank 43, a first additive 50 is supplied by pump 55 from the additive solution tank 44, a second additive 51 is supplied by pump 56 from the additive solution tank 45, a copper sulfate solution 52 is supplied by pump 57 from the copper sulfate solution tank 46, a sulfuric acid solution 53 is supplied by pump 58 from the sulfuric acid tank 47, and a hydrochloric acid solution 54 is supplied by pump 59 from the hydrochloric acid tank 48.

The above-described solutions are supplied in order to add appropriate amounts of components to the plating solution. The highly concentrated copper sulfate solution 52 is added to achieve an appropriate concentration of copper ions. The sulfuric acid solution 53 and hydrochloric acid solution 54 are added to regulate the hydrogen ion index (PH value) and the concentration of chlorine ions. The organic first additive 50 and second additive 51 are added to regulate the plating solution 11-1. After the plating solution 11-1 has been regulated, the pump 12-16 supplies the plating solution 11-1 to the regulating tank 12-1 via the filter 12-17. In addition, the plating liquid recovering tank 43 is replenished with a pure water 61 supplied via a shutoff valve 60 when needed.

In the plating apparatus having the construction shown in FIGS. 7 and 8, the first room in which the plating section 1 is installed is a clean room. However, the first room is not limited to being a clean room, but can be any room or area having high cleanliness, such as a clean booth, clean bench, or clean box.

In the construction of the plating apparatus described in FIGS. 7 and 8, the power supply 11-5 is disposed in the plating section 1, which in turn is installed in the first room. However, it is also possible to provide the power supply 11-5 in the second room in which the control section 2 is installed, such that the power supply 11-5 supplies electricity from the second room. With this configuration, maintenance operations on the power supply 11-5 can also be performed in the second room housing the control section 2. If the power supply 11-5 is an accumulator (storage battery), in particular, it is desirable to perform the dirty maintenance work required for the accumulator in the second room.

In the construction described in FIGS. 7 and 8, one plating section 1 is provided with one control section 2. However, it is also possible to configure the plating apparatus with one control section 2 for a plurality of plating sections 1. In this case, the plurality of plating sections 1 is installed in the first room, while the single control section 2 is installed in the second room, and the one control section 2 controls the plurality of plating sections 1.

While the description of some apparatus were omitted from the construction described in FIGS. 7 and 8, mechanisms that require maintenance such as a flow meter for measuring the flow of solution including plating solution or electrolytic solution, a pressure gauge for measuring pressure, and a temperature gauge are installed in the second room having a low degree of cleanliness. Accordingly, there is no fear of contaminating the first room having a high level of cleanliness by performing such maintenance in that room.

Although the object of plating is described as the substrate 11-4, such as a semiconductor wafer, the plating object is not limited to a substrate.

In summary, the present invention has the following superior effects. (1) The present invention provides functions for processing wasted wash water and recovering used plating solution, as well as a special self-determining function for processing plating solution and solution including plating solution. Therefore, these processes are carried out efficiently. (2) Most maintenance work on the plating apparatus can be performed in the second room housing the control section. Thereby, it improves the efficiency of maintenance work and prevents contamination of the first room housing the plating section, which must maintain a high level of cleanliness.

INDUSTRIAL APPLICABILITY

The present invention relates to a plating apparatus for forming metal plating on a substrate, such as a semiconductor wafer. Therefore, this plating apparatus applies to industrial fields such as semiconductor fabrication that require a high degree of cleanliness and precision plating.

What is claimed is:

1. A plating apparatus comprising:

a plating section having a plating bath for plating a semiconductor substrate; and a control section having a regulating tank connected to said plating bath in said plating section, said regulating tank accommodating a plating solution to be supplied to said plating bath in said plating section;

wherein said control section comprises:

an analyzer for analyzing said plating solution to be supplied from said regulating tank in said control section to said plating bath in said plating section;

a replenishing tank accommodating an additive solution; and a replenishing mechanism for replenishing said regulating tank with said additive solution in said replenishing tank, wherein said plating section is disposed in a clean room, and said control section is disposed in a space that is separated from said clean room.

2. A plating apparatus according to claim 1, wherein said replenishing mechanism replenishes said regulating tank with said additive solution in accordance with the number of processed semiconductor substrates.

3. A plating apparatus according to claim 1, wherein said analyzer adapted to analyze to the composition and concentration of said plating solution.

4. A plating apparatus according to claim 1, wherein said replenishing mechanism adapted to replenish said regulating tank with said additive solution based on the composition and concentration analyzed by said analyzer.

5. A plating apparatus according to claim 1, wherein said additive solution comprises an organic additive solution.

6. A plating apparatus according to claim 5, wherein said organic additive solution comprises a mixture of a polymer, a leveler, a carrier, and HCl.

7. A plating apparatus according to claim 1, further comprising a washing apparatus disposed in said plating section for washing a semiconductor substrate after the plating process.

8. A plating apparatus according to claim 7, wherein said washing apparatus comprises a nozzle for ejecting a wash water toward said semiconductor substrate.

9. A plating apparatus according to claim 1, wherein:

said plating bath in said plating section has plating chambers, which are provided by dividing said plating section with an ion exchange membrane or a porous membrane into an anode chamber and a cathode chamber;

an anode is disposed in said anode chamber, and said semiconductor substrate, which adapted to serve as a cathode, is disposed in said cathode chamber;

said anode and said semiconductor substrate are opposed to each other across said ion exchange membrane or said porous membrane; and said plating section has a power supply connected to said anode adapted for connection and said semiconductor substrate.

10. A plating apparatus according to claim 1, further comprising a filter connected to said regulating tank in said control section.

11. A plating apparatus according to claim 1, further comprising a temperature regulator disposed in said plating section for regulating the temperature of said plating solution in said plating bath.

12. A plating apparatus according to claim 1, wherein said replenishing mechanism adapted to replenish said regulating tank with said additive solution in accordance with the continuous performance of the plating process and the number of processed semiconductor substrates to maintain the composition and concentration of said plating solution at a predetermined value.

13. A plating apparatus according to claim 1, further comprising a temperature regulator disposed in said control section for regulating the temperature of said plating solution in said regulating tank.

14. A plating apparatus according to claim 1, further comprising a circulating mechanism for circulating said plating solution between said regulating tank in said control section and said plating bath in said plating section.

15. A plating apparatus according to claim 1, wherein a plurality of said plating sections are provided for the one control section.

16. A plating apparatus according to claim 1, wherein said control section is disposed in a utility room having a level of cleanliness that is lower than that of said clean room.

17. A plating apparatus according to claim 1, further comprising:

a retainer disposed in said plating bath for holding a semiconductor substrate;

an anode disposed in said plating bath, said anode being horizontally opposed to said semiconductor substrate; and a power supply adapted for connection to said semiconductor substrate and said anode.

18. A plating apparatus according to claim 17, wherein said retainer has a seal provided therearound for hermetically sealing said retainer on the top of said plating bath.

19. A plating apparatus according to claim 7, wherein said washing apparatus comprises a wash water tank for receiving and accommodating a wash water that has been used.

20. A plating apparatus according to claim 19, wherein said control section comprises a metallic ion extractor connected to said wash water tank for extracting a metallic ion from the wash water that has been used.

21. A plating apparatus according to claim 19, wherein said control section comprises a wash water recovering apparatus connected to said wash water tank for recovering the wash water that has been used.

22. A plating apparatus according to claim 1, further comprising a solution recovering apparatus disposed in said control section for regulating said plating solution in said regulating tank.

23. A plating apparatus according to claim 1, further comprising an apparatus for returning a plating solution, overflowing from an upper portion of said plating bath, to said regulating tank.

24. A plating method for plating a semiconductor substrate in a plating bath disposed in a plating section, said plating method comprising:

disposing the plating section in a cleanroom;

preparing a control section having a regulating tank accommodating a plating solution to be supplied to the plating bath in said plating section, and an analyzer for analyzing the plating solution to be supplied from the regulating tank;

disposing the control section in a space that is separated from the clean room;

supplying at least a portion of a plating solution to the analyzer from the regulating tank;

analyzing the plating solution; and replenishing the regulating tank with an additive solution accommodated in a replenishing tank.

25. A plating method according to claim 24, wherein the regulating tank is replenished with the additive solution in accordance with the number of processed semiconductor substrates.

26. A plating method according to claim 24, wherein the analysis of the plating solution includes analyzing the composition and concentration of the plating solution.

27. A plating method according to claim 24, wherein the regulating tank is replenished with the additive solution based on the composition and concentration analyzed by the analyzer.

28. A plating method according to claim 24, wherein a starter additive is used as the additive solution at the beginning of the plating process.

29. A plating method according to claim 24, wherein a replenishing additive is used as the additive solution when the plating process is continuously performed.

30. A plating method according to claim 24, wherein the regulating tank is replenished with the additive solution in accordance with the continuous performance of the plating process and the number of processed semiconductor substrates to maintain the composition and concentration of the plating solution at a predetermined value.

31. A plating method according to claim 24, further comprising circulating the plating solution between the regulating tank and the plating bath.

32. A plating apparatus comprising:

a plating section for plating a plating object, the plating section comprising a plating bath in which the plating process is performed;

a control section for regulating a plating solution and a solution containing the plating solution, the control section comprising a regulating tank for regulating a composition and/or concentration of a plating solution and a replenishing mechanism for injecting a replenishing solution into the plating solution; and a circulating mechanism provided for circulating the plating solution between the regulating tank in the control section and the plating bath in the plating section, wherein the plating section is housed in a first room and the control section is housed in a second room, which is separated from the first room.

33. A plating apparatus according to claim 32, wherein:

the plating section has plating chambers, which are provided by dividing the plating section with an ion exchange membrane or a porous membrane into an anode chamber and a cathode chamber;

the anode is insoluble and disposed in the anode chamber accommodating the electrolytic solution and the cathode, serving as the plating object, is disposed in the cathode chamber accommodating plating solution and opposes the anode across the ion exchange membrane or the porous membrane;

the control section has a regulating tank, which is divided with a membrane having high ion selectivity into an anode chamber and a cathode chamber;

the anode is soluble and disposed in the anode chamber accommodating the plating solution and the cathode is disposed in the cathode chamber accommodating electrolytic solution and opposes the anode across the membrane having high ion selectivity;

the soluble anode emits metallic ions into the plating solution; and a replenishing mechanism is provided for replenishing the anode chamber with the plating solution and/or additives and for replenishing the cathode chamber with the electrolytic solution and/or additives.

34. A plating apparatus according to claim 32, wherein the plating section further comprises a washing apparatus for washing the plating object after the plating process; and the control section further comprises:

an analyzer for extracting a portion of the plating solution from the regulating tank and analyzing the composition and/or measuring the concentration of the plating solution;

an ion removing apparatus for removing metallic ions contained in washing solution in the washing apparatus after the washing solution is used to wash the plating object or for removing metallic ions from the washing solution and recovering the washing solution; and a plating solution recovering apparatus for extracting plating solution from the regulating tank, removing foreign matter from the plating solution, and regulating the metallic ion concentration, hydrogen ion index, and the like of the plating solution.

35. A plating apparatus according to claim 32, wherein the first room has a high level of cleanliness and the second room has a level of cleanliness that is lower than that of the first room.

36. A plating apparatus according to claim 32, wherein a plurality of the plating sections are disposed in the first room for one control section disposed in the second room.

37. A plating apparatus comprising:

a plating section having a plating bath for plating a semiconductor substrate; and a control section having a regulating tank to regulate the composition and/or concentration of the plating solution, wherein said control section comprises:

an analyzer for analyzing the plating solution to be supplied from said regulating tank in said control section to said plating bath in said plating section;

a replenishing tank accommodating an additive solution;

a replenishing mechanism for replenishing said regulating tank with said additive solution in said replenishing tank; and a circulating mechanism for circulating the plating solution between said regulating tank in said control section and said plating bath in the plating section.

38. A plating apparatus according to claim 37, wherein said replenishing mechanism replenishes said regulating tank with said additive solution in accordance with the number of processed semiconductor substrates.

39. A plating apparatus according to claim 37, wherein said analyzer is operable to analyze the composition and concentration of the plating solution.

40. A plating apparatus according to claim 37, wherein said replenishing mechanism replenishes said regulating tank with said additive solution based on the composition and concentration analyzed by said analyzer.

41. A plating apparatus according to claim 37, wherein said additive solution comprises an organic additive solution.

42. A plating apparatus according to claim 41, wherein said organic additive solution comprises a mixture of a polymer, a leveler, a carrier, and HCl.

43. A plating apparatus according to claim 37, further comprising a washing apparatus disposed in said plating section for washing a semiconductor substrate after the plating process.

44. A plating apparatus according to claim 43, wherein said washing apparatus comprises a nozzle for ejecting a wash water toward said semiconductor substrate.

45. A plating apparatus according to claim 43, wherein said washing apparatus comprises a wash water tank for receiving and accommodating a wash water that has been used.

46. A plating apparatus according to claim 45, wherein said control section comprises a metallic ion extractor connected to said wash water tank for extracting a metallic ion from the wash water that has been used.

47. A plating apparatus according to claim 45, wherein said control section comprises a wash water recovering apparatus connected to said wash water tank for recovering the wash water that has been used.

48. A plating apparatus according to claim 37, wherein:

said plating bath in said plating section has plating chambers, which are provided by dividing said plating section with an ion exchange membrane or a porous membrane into an anode chamber and a cathode chamber;

an anode is disposed in said anode chamber, and said semiconductor substrate serving as a cathode is disposed in said cathode chamber;

said anode and said semiconductor substrate are opposed to each other across said ion exchange membrane or said porous membrane; and said plating section has a power supply connected to said anode and said semiconductor substrate.

49. A plating apparatus according to claim 37, further comprising a filter connected to said regulating tank in said control section.

50. A plating apparatus according to claim 37, further comprising a temperature regulator disposed in said plating section for regulating the temperature of the plating solution in said plating bath.

51. A plating apparatus according to claim 37, wherein said replenishing mechanism adapted to replenish said regulating tank with said additive solution in accordance with the continuous performance of the plating process and the number of processed semiconductor substrates to maintain the composition and concentration of the plating solution at a predetermined value.

52. A plating apparatus according to claim 37, further comprising a temperature regulator disposed in said control section for regulating the temperature of the plating solution in said regulating tank.

53. A plating apparatus according to claim 37, wherein a plurality of said plating sections are disposed for one control section.

54. A plating apparatus according to claim 37, wherein said control section is disposed in a utility room having a level of cleanliness that is lower than that of said clean room.

55. A plating apparatus according to claim 37, further comprising:

a retainer disposed in said plating bath for holding a semiconductor substrate;

an anode disposed in said plating bath, said anode being horizontally opposed to said semiconductor substrate; and a power supply adapted for connection to said semiconductor substrate and said anode.

56. A plating apparatus according to claim 55, wherein said retainer has a seal provided therearound for hermetically sealing said retainer on the top of said plating bath.

57. A plating apparatus according to claim 37, further comprising a solution recovering apparatus disposed in said control section for regulating the plating solution in said regulating tank.

58. A plating apparatus according to claim 37, further comprising an apparatus for returning a plating solution, overflowing from an upper portion of said plating bath, to said regulating tank.

*59. A plating apparatus comprising:*

*a plating section having at least one plating bath containing a plating solution for plating a substrate; and*

*a control section having a regulator tank fluidly connected to said at least one plating bath and accommodating the plating solution to be supplied to said at least one plating bath, said regulator tank being adapted to regulate composition and/or concentration of the plating solution, said control section comprising:*

*a temperature regulator for regulating temperature of the plating solution in said regulator tank;*

*an analyzer fluidly connected to said regulator tank and adapted to extract a portion of the plating solution from said regulator tank for analyzing the composition and/or the concentration of the plating solution;*

*a first replenishing tank accommodating a plating solution of predetermined concentration;*

*a second replenishing tank accommodating an additive solution; and*

*a replenishing mechanism for supplying the plating solution of predetermined concentration to said regulator tank from said first replenishing tank or the additive solution to said regulator tank from said second replenishing tank, respectively, based on the results or the composition and/or concentration of the plating solution analyzed by said analyzer.*

*60. The plating apparatus according to claim 59, further comprising a substrate retainer to mount the substrate horizontally while the substrate is being plated.*

*61. The plating apparatus according to claim 60, further comprising an anode to be positioned below the substrate in said at least one plating bath, and a power source to be connected between said anode and the substrate for supplying a plating current to the substrate.*

*62. The plating apparatus according to claim 61, wherein said anode has at least one hole for allowing the plating solution to pass therethrough.*

*63. The plating apparatus according to claim 62, further comprising a casing for holding said anode and forming a space for containing the plating solution, wherein the plating solution in said casing is to be supplied through said at least one hole of said anode.*

*64. The plating apparatus according to claim 59, further comprising a filter provided in a circulating path for circulating the plating solution between said at least one plating bath and said regulator tank.*

*65. The plating apparatus according to claim 59, further comprising a plating solution recovering apparatus for extracting the plating solution and regenerating the extracted plating solution.*

*66. The plating apparatus according to claim 65, further comprising a fluid passage connected to said regulator tank for extracting the plating solution from said at least one plating bath and supplying the extracted plating solution to said plating solution recovering apparatus.*

*67. A plating apparatus comprising:*

*a plating section having at least one plating bath containing a plating solution for plating a substrate; and*

*a control section having a regulator tank fluid connected to said at least one plating bath and accommodating the plating solution to be supplied to said at least one plating bath, said regulator tank being adapted to regulate composition and/or concentration of the plating solution, said control comprising:*

*an analyzer fluidly connected to said regulator tank and adapted to extract a portion of the plating solution from said regulator tank for analyzing the composition and/or the concentration of the plating solution;*

*a first replenishing tank accommodating a plating solution of predetermined concentration;*

*a second replenishing tank accommodating an additive solution; and*

*a replenishing mechanism for supplying the plating solution of predetermined concentration to said regulator tank from said first replenishing tank via a first supply line, or for supplying the additive solution to said regulator tank from said second replenishing tank via a second supply line, based on results of the composition and/or concentration of the plating solution analyzed by said analyzer.*

*68. The plating apparatus according to claim 67, further comprising a substrate retainer to mount the substrate horizontally while the substrate is being plated.*

*69. The plating apparatus according to claim 68, further comprising an anode to be positioned below the substrate in said at least one plating bath, and a power source to be connected between said anode and the substrate for supplying a plating current to the substrate.*

*70. The plating apparatus according to claim 69, wherein said anode has at least one hole for allowing the plating solution to pass therethrough.*

*71. The plating apparatus according to claim 70, further comprising a casing for holding said anode and forming a space for containing the plating solution, wherein the plating solution in said casing is to be supplied through said at least one hole of said anode.*

*72. The plating apparatus according to claim 67, further comprising a filter provided in a circulating path for circulating the plating solution between said at least one plating bath and said regulator tank.*

*73. The plating apparatus according to claim 67, further comprising a plating solution recovering apparatus for extracting the plating solution and regenerating the extracted plating solution.*

*74. The plating apparatus according to claim 73, further comprising a fluid passage connected to said regulator tank for extracting the plating solution from said at least one plating bath and supplying the extracted plating solution to said plating solution recovering apparatus.*

*75. A plating apparatus comprising:*

*a plating section having a plating bath to contain a plating solution; and*

*a control section having a regulator tank in fluid communication with said plating bath, said regulator tank being adapted to receive the plating solution and supply the plating solution to said plating bath, said control section comprising:*

*an analyzer in fluid communication with said regulator tank, said analyzer being adapted to receive a portion of the plating solution and analyze the composition and/or concentration of the portion of the plating solution;*

*a first replenishing tank in fluid communication with said regulator tank via a first supply line, said first replenishing tank being adapted to supply a plating solution of predetermined concentration to said regulator tank via said first supply line in response to the analyzed composition and/or concentration of the portion of the plating solution; and*

*a second replenishing tank in fluid communication with said regulator tank via a second supply line, said second replenishing tank being adapted to supply an additive solution to said regulator tank via said second supply line in response to the analyzed composition and/or concentration of the portion of the plating solution.*

*76. The plating apparatus according to claim 75, further comprising a substrate retainer to mount the substrate horizontally while the substrate is being plated.*

*77. The plating apparatus according to claim 76, further comprising an anode to be positioned below the substrate in said at least one plating bath, and a power source to be connected between said anode and the substrate for supplying a plating current to the substrate.*

*78. The plating apparatus according to claim 77, wherein said anode has at least one hole for allowing the plating solution to pass therethrough.*

*79. The plating apparatus according to claim 78, further comprising a casing for holding said anode and forming a space for containing the plating solution, wherein the plating solution in said casing is to be supplied through said at least one hole of said anode.*

*80. The plating apparatus according to claim 75, further comprising a filter provided in a circulating path for circulating the plating solution between said at least one plating bath and said regulator tank.*

*81. The plating apparatus according to claim 75, further comprising a plating solution recovering apparatus for extracting the plating solution and regenerating the extracted plating solution.*

*82. The plating apparatus according to claim 81, further comprising a fluid passage connected to said regulator tank for extracting the plating solution from said at least one plating bath and supplying the extracted plating solution to said plating solution recovering apparatus.*

* * * * *